United States Patent [19]

Murray et al.

[11] Patent Number: 5,255,321
[45] Date of Patent: Oct. 19, 1993

[54] ACOUSTIC TRANSDUCER FOR AUTOMOTIVE NOISE CANCELLATION

[75] Inventors: Fancher M. Murray, Thousand Oaks; Richard L. Weisman, Pasadena, both of Calif.

[73] Assignee: Harman International Industries, Inc., Northridge, Calif.

[21] Appl. No.: 623,283

[22] Filed: Dec. 5, 1990

[51] Int. Cl.⁵ .............................................. A61F 11/06
[52] U.S. Cl. .................................... 381/71; 381/152; 381/162; 381/202
[58] Field of Search ................. 381/71, 152, 162, 202

[56] References Cited

U.S. PATENT DOCUMENTS

| | | |
|---|---|---|
| 2,043,416 | 6/1936 | Lueg . |
| 3,826,870 | 7/1974 | Wurm et al. . |
| 3,936,606 | 2/1976 | Wanke . |
| 4,044,203 | 8/1977 | Swinbanks . |
| 4,122,303 | 10/1978 | Chaplin et al. . |
| 4,153,815 | 5/1979 | Chaplin et al. . |
| 4,171,465 | 10/1979 | Swinbanks . |
| 4,417,098 | 11/1983 | Chaplin et al. . |
| 4,473,906 | 9/1984 | Warnaka et al. . |
| 4,489,441 | 12/1984 | Chaplin . |
| 4,490,841 | 12/1984 | Chaplin et al. . |
| 4,527,282 | 7/1985 | Chaplin et al. . |
| 4,566,118 | 1/1986 | Chaplin et al. . |
| 4,596,033 | 6/1986 | Swinbanks . |
| 4,600,863 | 7/1986 | Chaplin et al. . |
| 4,637,048 | 1/1987 | Swinbanks . |
| 4,644,783 | 2/1987 | Roberts et al. . |
| 4,654,871 | 3/1987 | Chaplin et al. . |
| 4,665,549 | 5/1987 | Eriksson et al. ...................... 381/71 |
| 4,669,122 | 5/1987 | Swinbanks . |
| 4,689,821 | 8/1987 | Salikuddin et al. . |
| 4,715,559 | 12/1987 | Fuller . |
| 4,783,817 | 11/1988 | Hamada et al. . |
| 4,805,733 | 2/1989 | Masahiko et al. . |
| 4,815,139 | 3/1989 | Eriksson et al. . |
| 4,837,834 | 6/1989 | Allie . |
| 4,862,508 | 8/1989 | Lemon . |
| 4,947,434 | 8/1990 | Ito ...................................... 381/71 |
| 4,965,832 | 10/1990 | Edwards et al. . |

Primary Examiner—Jin F. Ng
Assistant Examiner—Nina Tong
Attorney, Agent, or Firm—Jones, Day, Reavis & Pogue

[57] ABSTRACT

An acoustic transducer is disclosed for incorporation into an engine exhaust system or other gas carrying duct. The transducer produces pressure variations within the duct in accordance with an applied electrical signal. The transducer is especially suitable for use as part of a noise cancellation system whereby inverse pressure variations produced by the transducer cancel noise propagating in the duct. The design of the transducer allows its use when the duct is one carrying high temperature gases such as an automobile exhaust pipe.

6 Claims, 3 Drawing Sheets

5,255,321

ACOUSTIC TRANSDUCER FOR AUTOMOTIVE NOISE CANCELLATION

FIELD OF INVENTION

The present invention relates to an improved apparatus for generating inverse sound waves in a conduit through which passes an unstable gas flow in order to cancel audio-frequency pressure variations. It is particularly well-suited for utilization in automotive active noise control systems.

BACKGROUND

A common source of environmental noise is sound produced by engines which is transmitted to the environment by means of air or other gas moving through a conduit. For example, fans used for moving air through air ducts in building HVAC systems generate a great deal of low frequency noise. Although a fan can be isolated from the building's inhabitants, the air duct through which it forces air provides an acoustic pathway for the transmission of noise. Similarly, the noise produced by internal combustion engines necessarily escapes to the environment through the engine's exhaust pipe. The first and still most commonly used method for reducing these types of environmental noise is the interposition of a muffler in the duct or exhaust pipe. Mufflers either cause some of the noise to be reflected back to the source by means of an acoustic impedance discontinuity or cause some of the noise to be absorbed and thus converted into heat by a sound absorptive lining.

Although such mufflers are generally effective in reducing noise, they also necessarily introduce a flow restriction in the duct or exhaust pipe. A flow restriction in an air duct obviously diminishes the efficiency, at which a fan can deliver air through the duct. A flow restriction in the exhaust pipe of an internal combustion engine means that the engine must exhaust against a higher pressure which reduces the fuel efficiency of the engine.

In the case of air ducts which transmit noise from machinery such as HVAC fans or industrial blowers, the reduction in efficiency caused by mufflers has provided part of the impetus for the development of so-called "active" noise reduction systems. In contrast to "passive" noise control techniques (i.e., mufflers), active systems control the propagation of sound in a duct by generating additional sound waves within the duct having the same amplitude but with opposite phase to those emanating from the noise source. The additional sound waves thus produce an effective acoustical short circuit to cancel the unwanted noise. Systems for such active noise cancellation generally comprise a loudspeaker mounted so as to radiate sound into the duct, an input microphone for sensing sound upstream (i.e., toward the noise source) from the loudspeaker, an error microphone for sensing sound downstream from the loudspeaker, and a controller for driving the loudspeaker in accordance with signals received from the input and error microphones which attempts to minimize the sound radiated into the external environment.

Such active noise control systems as described above have been successfully used for attenuating sound in air ducts. Similar systems can be employed in the case of an internal combustion engine. Mounting a loudspeaker directly within an exhaust pipe, however, is impractical due to the high temperature of the exhaust gases. One prior attempt to solve this problem has involved mounting the loudspeaker within an outer plenum chamber which concentrically surrounds the exhaust pipe. The output of the loudspeaker then combines with the engine noise where the latter exits the exhaust pipe to effect the desired noise cancellation. The error microphone can be mounted near the exhaust pipe outlet as well for providing the error feedback signal. A feedforward signal can be derived from either an electrical-signal proportional to engine speed or from an input microphone designed for a high temperature environment mounted within the exhaust pipe.

The use of a noise cancellation loudspeaker mounted within an outer plenum chamber, however, does not allow for very effective cancellation of the sound exiting the exhaust pipe since sound from the loudspeaker and from the engine cannot be directly combined. A much more effective noise cancellation effect could be obtained if the loudspeaker's sound were to radiate directly into the engine exhaust pipe.

SUMMARY OF THE INVENTION

The present invention is an acoustic transducer for modulating the cross-sectional area of a conduit interposed within an engine exhaust pipe, or other duct through which a gas flows, in order to produce pressure variations in accordance with an applied electrical signal. The transducer is particularly well-suited for serving as the actuating element in a system for canceling engine noise propagating within an engine's exhaust pipe carrying high temperature gas.

The acoustic transducer that is the present invention basically comprises a conduit and an actuator. The conduit may be inserted within the exhaust system of an engine or any other type of gas containing duct. The conduit comprises an inlet, an outlet, and a mid-portion having a flexible and vibratable wall surface in order to serve as a diaphragm for the actuator. In a preferred embodiment, the mid-portion of conduit has two such diaphragms which comprise opposite facing walls. The actuator includes a shaft or "stinger" rigidly connected to each diaphragm which vibrates in a direction normal to the surface of the diaphragm in accordance with an applied oscillatory electrical signal. The motion of the stinger thus causes vibratory deformation of the diaphragm which thereby causes corresponding pressure variations in the gas contained within the conduit.

It is an object of the present invention to provide an acoustic transducer suitable for producing cross-sectional variations within a gas carrying duct as part of a system to effect demodulation of gas flow disturbances propagating within the duct.

It is a further object to provide a transducer capable of producing pressure variations which efficiently cancel the noise waveforms propagating in the duct and is suitable for application to a duct carrying high temperature gases.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
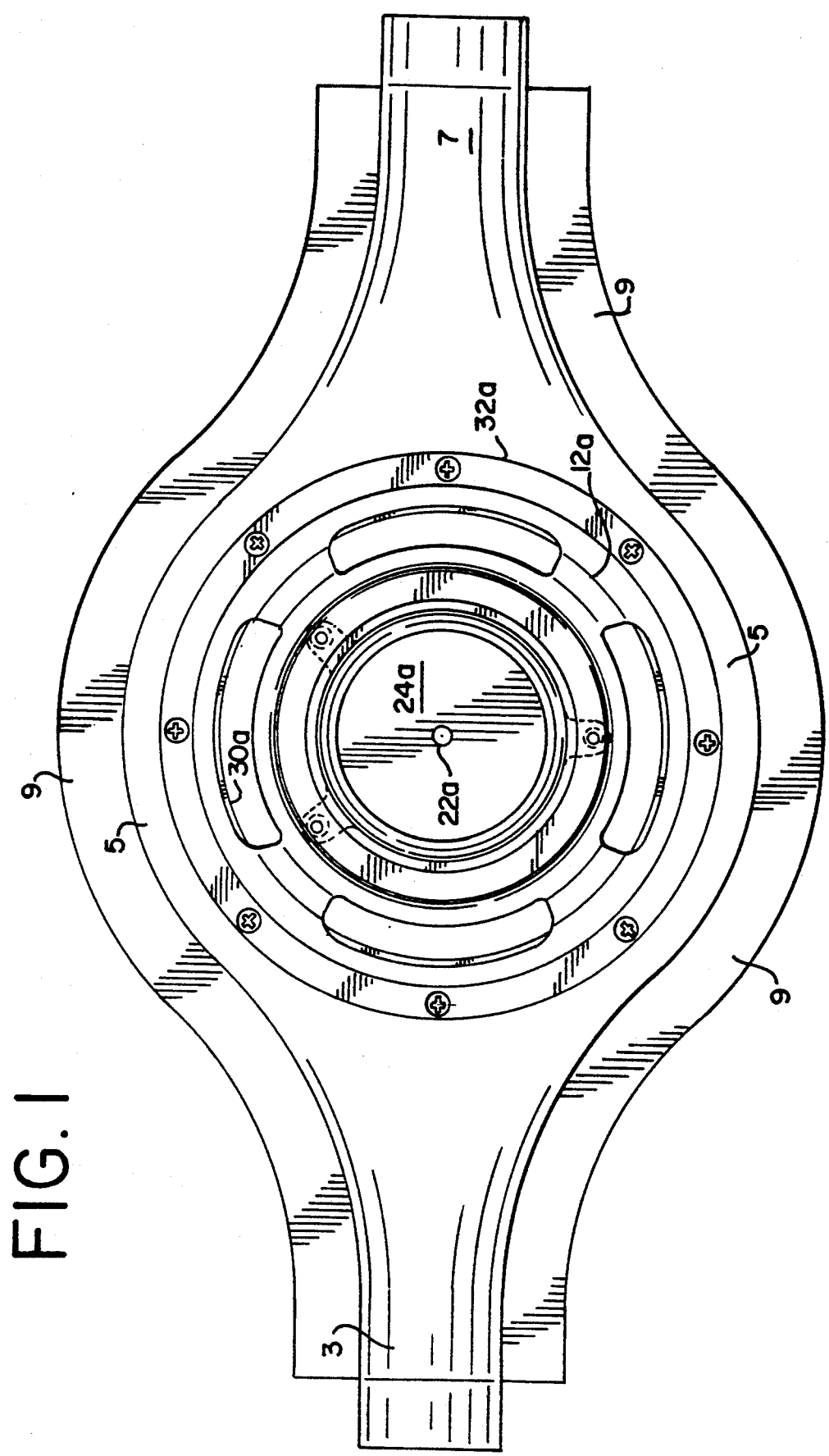
FIG. 1 is a top or bottom view of the transducer.
Figure 2:
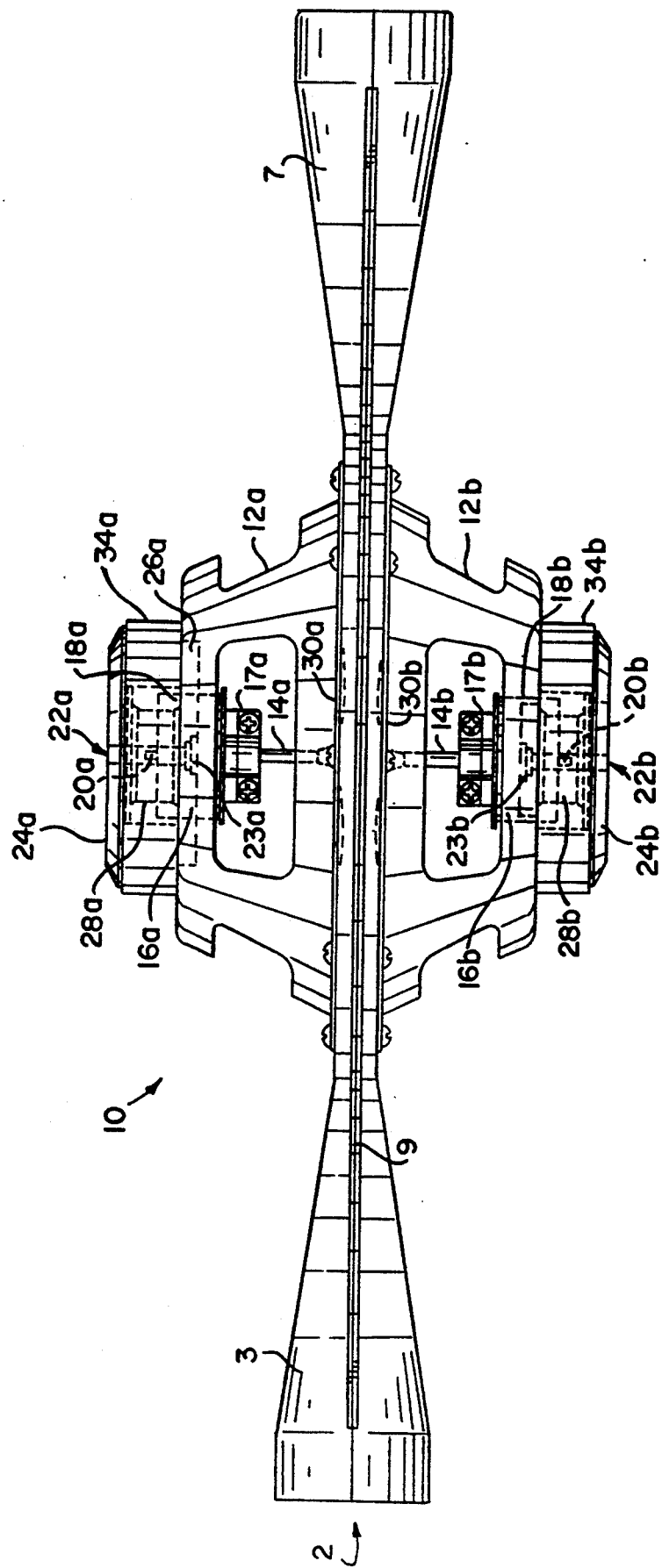
FIG. 2 is a side view of the transducer showing the working components in broken lines.
Figure 3:
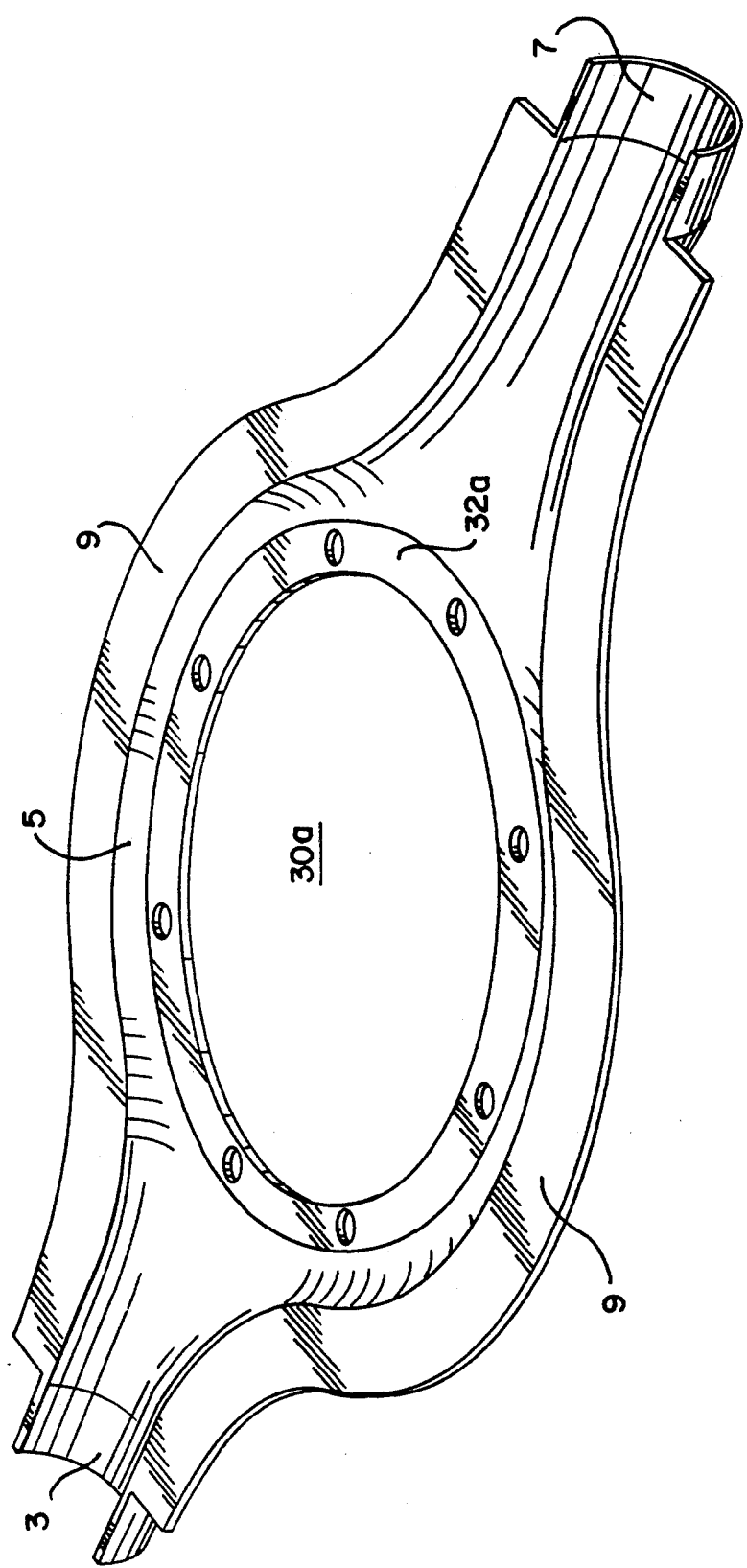
FIG. 3 is a perspective view of one of the two shell halves making up the conduit portion of the transducer.

An exemplary embodiment of an acoustic transducer in accordance with the present invention is depicted in FIGS. 1 through 3. The transducer comprises two basic portions: a metallic shell or conduit 2 and an actuator 10. The conduit 2 consists of an inlet portion 3, a mid-portion 5, and an outlet portion 7. The conduit 2 is designed for being made a part of an engine exhaust pipe or other gas carrying duct and in this embodiment is constructed from two identical halves, one of which is shown in FIG. 3. To form the completed structure, the flanges 9 of the two conduit halves are rigidly connected so as to form a gas tight seal (e.g., by welding). The outlet 7 and inlet 3 of the conduit 2 are thus generally cylindrical while the mid-portion is seen to be of a generally discoid shape with flattened top and bottom walls. At the center of each of the top and bottom walls of the conduit mid-portion is a relatively flexible circular diaphragm 30a and 30b, made of metallic material. In this embodiment, the diaphragms 30a and 30b are constructed from titanium so that they may be thin but still resistant to the high temperature exhaust gases.

The actuator 10 vibrates the diaphragms 30a and 30b in opposition to each other in accordance with an applied electrical signal. The vibrating diaphragms then produce pressure variations in the gas within the conduit. Actuator 10 comprises a pair of actuator assemblies, one for each of the diaphragms 30a and 30b. Only one such assembly will now be described with the understanding that the other actuator assembly is in all respects identical. The components of each assembly in the figures are designated with a reference numeral followed by "a" or "b" depending upon whether the assembly is associated with diaphragm 30a or 30b, respectively.

Circumscribing the diaphragm 30a is a mounting ring 32a upon which is bolted actuator basket 12a. As shown in FIG. 2, rigidly connected to the back of the basket 12a is an annular permanent magnet 34a. Rigidly connected to the back magnet 34a is a backplate 24a constructed from ferromagnetic material. Rigidly connected to the same side of the backplate 24a and residing within the space bounded by annular magnet 34a is center pole piece 28a, also constructed from ferromagnetic material. A shaft 22a runs through the center of center pole piece 28a and backplate 24a. Within shaft 22a is a sleeve 23a (made of Teflon or equivalent material) through which is slideably mounted a center post 20a connected to coil form 16a. The sleeve 23a allows longitudinal motion of center post 20a. Coil form 16a is a cylindrical structure around which is wrapped actuator coil 18a. The actuator coil form 16a thus resides within basket 12a and protrudes into the annular space between the magnet 34a and center pole piece 28a. Attached to the front of the coil form 16a is the stinger mounting structure 17a. Protruding from the back surface of mounting structure 17a within the cylindrical coil form 16a is the center post 20a which inserts into sleeve 23a. On the front side of mounting structure 17a is rigidly mounted one end of the stinger 14a. The opposite end of stinger 14a is rigidly connected to diaphragm 30a. The stinger 14a as well as the mounting structure 17a in this embodiment may be constructed from ceramic material.

Actuator coil 18a is equivalent to the voice coil of a conventional loudspeaker and consists of multiple turns of an insulated conductor. The static magnetic field produced by the magnet 34a impinges on coil 18a in a direction perpendicular to the coil's cylindrical axis. The backplate 24a and center pole piece 28a provide a low reluctance pathway for the magnetic field in order to minimize the size of the magnet required to produce a given magnetic field strength at the actuator coil 18a. An annular ferromagnetic top plate 26a as shown in FIG. 2 may also be mounted at the front of magnet 34a so that the only air gap the magnetic field must traverse is the space between center pole piece 28a and the top plate 26a.

When an oscillatory electrical input signal is applied to the actuator coil 18a (via connections not shown in the drawings), oscillatory motion of the coil occurs along its cylindrical axis because of the force produced by the interaction between the coil current and the static magnetic field. This in turn causes corresponding motion of stinger 14a which deforms the diaphragm 30a. The resulting vibratory deformation of diaphragm 30a varies the cross-sectional area of the conduit 2 so as to produce pressure variations in the gas within conduit 2 in accordance with the applied electrical signal.

When an appropriate electrical signal is applied, the vibrating diaphragms 30a and 30b are ideally suited for producing inverse sound waves in order to cancel sound waves from a noise source which are propagating through the conduit 2. The sound waves emanating from the diaphragms 30a and 30b directly impinge upon the propagating noise waveforms with no attenuation due to diffraction so that very efficient noise cancellation may be effected. It is contemplated, however, that any such noise cancellation system will be most effective for frequencies under about 500 Hz. The wavelengths of sound waves at these frequencies are sufficiently long that the vibrating diaphragms 30a and 30b, when vibrated to effect noise cancellation, essentially remove the propagating noise waveform by expanding and contracting the volume of the conduit 2 containing the gas so as to maintain a relatively constant pressure.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. An acoustic transducer for producing pressure variations within a gas carrying duct in accordance with an applied electrical signal, comprising:
   a conduit for insertion within the duct, having an inlet, an outlet, and a mid-portion;
   wherein a part of the mid-portion of the conduit is relatively flexible so as to form a diaphragm, deformation of which produces pressure variations in the gas contained within the conduit;
   means for deforming the diaphragm in a vibratory manner in accordance with an applied oscillatory electrical signal; and,
   wherein the diaphragm deforming means is a stinger attached at one end to the diaphragm and oriented perpendicular thereto, and at the other end connected to an actuator coil of wire which is subjected to a static magnetic field.

2. The acoustic transducer as set forth in claim 1 further comprising:

an actuator basket mounted on the mid-portion of the conduit upon which is mounted an annular permanent magnet for producing a static magnetic field;

a center pole piece rigidly mounted within the actuator basket;

a cylindrical coil form having wrapped around it multiple turns of the actuator coil, the coil form being slideably connected to the center pole piece on one side and attached to the stinger on the other side, the actuator coil being thereby oriented to the static magnetic field such that oscillatory current flowing therethrough causes the stinger to deform the diaphragm in a vibratory manner.

3. The acoustic transducer as set forth in claim 2 wherein the coil form is slideably connected to the center pole piece by means of a center post inserting into a shaft in the center of the center pole piece.

4. An acoustic transducer for producing pressure variations within a gas carrying duct in accordance with an applied electrical signal, comprising:

a conduit for insertion within the duct, having and inlet, an outlet, and a mid-portion; p1 wherein a part of the mid-portion of the conduit is relatively flexible so as to form a diaphragm, deformation of which produces pressure variations in the gas contained within the conduit;

means for deforming the diaphragm in a vibratory manner in accordance with an applied oscillatory electrical signal; and, wherein the inlet and outlet of the conduit are generally cylindrical while the mid-portion is of a generally discoid shape with the flat wall surface of the mid-portion serving as the diaphragm.

5. The acoustic transducer as set forth in claim 4 wherein the diaphragm is made of titanium.

6. In a system for the active cancellation of noise in a gas containing duct, having means for producing an electrical signal of opposite phase to that of a noise waveform propagating in the duct, a transducer for converting the electrical signal into pressure variations within the duct for effective noise cancellation, comprising:

a conduit for containing gas when incorporated into the duct;

means for varying the cross-sectional area of the conduit in accordance with an applied electrical signal which thereby causes pressure variations within the conduit corresponding to the electrical signal; and, wherein the cross-sectional area varying means comprises a deformable wall of the conduit attached to a shaft which moves in a direction normal to the surface of the deformable wall in accordance with an applied oscillatory electrical signal so as to vibrate the deformable wall in accordance therewith.

* * * * *